United States Patent
Johnson et al.

(10) Patent No.: US 7,284,731 B1
(45) Date of Patent: Oct. 23, 2007

(54) SANITARY CLAMP

(76) Inventors: Theodore Donald Johnson, 2219 Glenmoor Rd. South, Clearwater, FL (US) 33764; Robin Boley-Johnson, 2219 Glenmoor Rd. South, Clearwater, FL (US) 33764

( * ) Notice: Subject to any disclaimer, the term of this patent is extended or adjusted under 35 U.S.C. 154(b) by 308 days.

(21) Appl. No.: 10/907,072

(22) Filed: Mar. 18, 2005

Related U.S. Application Data

(60) Provisional application No. 60/554,276, filed on Mar. 18, 2004.

(51) Int. Cl.
*F16L 3/08* (2006.01)

(52) U.S. Cl. .................... 248/74.4; 248/74.3; 285/406; 285/407; 24/21; 24/20 R

(58) Field of Classification Search ............... 248/74.3, 248/74.1, 74.4, 62, 63, 72; 24/20 R, 22, 24/284, 279, 20 TT, 16 PB, 21; 285/406, 285/407, 112, 373, 411, 367
See application file for complete search history.

(56) References Cited

U.S. PATENT DOCUMENTS

| | | | | |
|---|---|---|---|---|
| 3,235,925 A | * | 2/1966 | Gerhardt et al. .......... 24/23 EE |
| 3,359,018 A | * | 12/1967 | Simons ....................... 285/367 |
| 4,527,818 A | * | 7/1985 | Rundell .................. 285/148.17 |
| 4,643,461 A | * | 2/1987 | Thau et al. .................. 285/112 |
| 4,823,442 A | * | 4/1989 | Behr ........................... 24/20 R |
| 5,645,303 A | * | 7/1997 | Warehime et al. .......... 285/409 |

\* cited by examiner

*Primary Examiner*—Gwendolyn Baxter
(74) *Attorney, Agent, or Firm*—Ronald E. Smith; Smith & Hopen

(57) ABSTRACT

A clamp for a sanitary fitting includes a first and a second semicircular part that are circumscribed by a flexible cable tie. Each semicircular part has a concave side and a convex side. A channel is formed in each concave and each convex side. The concave channels accommodate a flange of a sanitary fitting when the first and second semicircular parts are disposed in confronting relation to one another. The cable tie positioned in the convex channels circumscribes the confronting semicircular parts. A cable tie catch slidingly receives a free end of the cable tie when the cable tie circumscribes the first and second semicircular parts. A marker on the cable tie registers with the catch or another marker on the cable tie when the cable tie is under a predetermined amount of tension to ensure that the same amount of tension is consistently applied to the cable tie.

8 Claims, 9 Drawing Sheets

SANITARY CLAMP

CROSS REFERENCE TO RELATED APPLICATION

This application claims priority to U.S. Provisional Patent Application No. 60/554,276 entitled: "Sanitary Clamp," filed by the same inventors on Mar. 18, 2004.

BACKGROUND OF THE INVENTION

1. Field of the Invention

This invention relates, generally, to clamps for sanitary fittings. More particularly, it relates to a clamp for clamping together two sanitary fittings with a force that is predetermined and which may be duplicated repeatedly.

2. Description of the Prior Art

Conventional sanitary clamps are typically made of stainless steel, a rigid plastic, or a combination of such materials. In a first well-known design, two semicircular parts are hingedly connected to one another at a first end and their free ends are secured to one another by a threaded stem and nut. In another well-known embodiment, the two semicircular sections are secured to one another by a flexible steel or plastic band that circumscribes them. A mechanism of the type commonly used on hose clamps pulls the semicircular parts toward one another by tightening the band via rotation of a worm gear that meshingly engages slots formed in the flexible band.

The primary drawback of the known clamps is that they include no means for applying an optimal amount of force. Accordingly, they are usually over-tightened. Over-tightening is particularly undesirable when a plastic fitting is used because the fitting may buckle. Such buckling can compromise the fluid tightness and the pressure resistance of the connection.

A closely related drawback is that the force applied by the known clamps is not repeatable. Thus, if a prior art clamp is tightened by an optimal force-providing amount, by luck, there is no means for repeating such optimal tightening the next time a clamp of the same structure is used.

There is a particular type of commercially available sanitary clamp that includes a torque indicator in a threaded closure nut that overcomes the over-tightening problem. However, this is a relatively expensive solution to the problem.

A conventional torque wrench may also be used to overcome the over-tightening problem. However, such wrenches are cumbersome and inconvenient to use.

Another drawback associated with sanitary fittings that are tightened with torque wrenches is that the installation is not tamper-evident. A torque wrench on a simple screw clamp, even if it is incorporated into the clamp, is easily opened. If the sanitary fitting is opened and tampered with and re-closed with a torque wrench, there is no evidence of such tampering Moreover, the amount of tension applied to the clamp cannot be checked by visual inspection after the torque wrench has been removed.

What is needed is an inexpensive clamp that may be tightened repeatedly and consistently to an optimal tightness but that does not require an internal torque indicator in a threaded closure nut or use of a torque wrench.

There is also a need for a tamper-evident installation.

A need is also extant for an installation that provides a visual indication of whether or not a sanitary fitting has been properly tightened.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for a means for an improved clamp for sanitary fittings is now met by a new, useful, and non-obvious invention. The novel clamp includes an elongate, flexible cable tie and a first semicircular clamp part having an interior, concave side and an exterior, convex side. A first inner channel is formed in the interior, concave side of the first semicircular clamp part. The novel structure further includes a second semicircular clamp part having an interior, concave side and an exterior, convex side. A second inner channel is formed in the interior, concave side of the second semicircular clamp part.

The first and second inner channels are adapted to accommodate a flange of a sanitary fitting when the first and second semicircular parts are disposed in confronting relation to one another.

The elongate, flexible cable tie has a length sufficient to circumscribe the first and second semicircular parts when the first and second semicircular parts are disposed in confronting relation to one another. The cable tie further includes a cable tie catch at a proximal end thereof and a free end at a distal end thereof. The cable tie catch is adapted to slidingly receive the free end when the elongate, flexible cable tie is disposed in circumscribing relation to the confronting first and second semicircular parts.

In a first embodiment, a first distance mark is imprinted or otherwise formed on the flexible cable tie at a predetermined location thereon near said distal free end. A second distance mark is imprinted or otherwise formed on the flexible cable tie at a predetermined location thereon near said proximal end. The first distance mark is in registration with the second distance mark when the elongate, flexible cable tie is under a predetermined amount of tension. The same amount of tension is therefore consistently applied to the elongate, flexible cable tie by tightening the cable tie until the first and second distance marks are in registration with one another.

In a second embodiment, the second distance mark is a predetermined edge of said catch so that the clamp is optimally tightened when the first distance mark is in alignment with said predetermined edge of said catch.

The first inner channel extends from a first end of the first semicircular clamp part to a second end of the first semicircular clamp part and the second inner channel extends from a first end of the second semicircular clamp part to a second end of the second semicircular clamp part.

A first exterior channel is formed in the exterior, convex side of the first semicircular clamp part and a second exterior channel is formed in the exterior, convex side of the second semicircular clamp part. The elongate, flexible cable tie is received within the first and second exterior channels when the flexible cable tie is disposed in said circumscribing relation to the first and second semicircular parts.

The first and second inner channels each have a flat bottom and opposed sidewalls that taper toward one another from top to bottom. A pair of axially aligned sanitary fittings are therefore pushed in converging relation toward one another by the opposed sidewalls of the first and second inner channels when the confronting semicircular parts are pushed toward one another as the flexible cable tie is tightened.

Alternatively, the first and second inner channels may have an arch-shape in lieu of the tapered sidewalls and flat bottom shape. A pair of axially aligned sanitary fittings is pushed in converging relation toward one another by the arch-shape of the first and second inner channels when the confronting semicircular parts are pushed toward one another as the flexible cable tie is tightened.

An important advantage of the novel structure is that it enables the clamp to be tightened to a predetermined optimal amount.

Moreover, the tightening to said optimal amount is repeatable any number of times.

The alignment of first and second distance marks on opposite ends of the cable tie provides an effective way to visually ascertain when the cable tie is properly tightened, as does the provision of a single distance mark and its alignment with a predetermined edge of the catch.

Moreover, if a cable tie is of the non-reusable type, any cutting thereof is readily apparent. Thus, a non-reusable cable tie provides evidence of tampering if it is tampered with.

If the cable tie is of the reusable type, it may be reused multiple times.

These and other advantages will become apparent as this disclosure proceeds. The invention includes the features of construction, arrangement of parts, and combination of elements set forth herein, and the scope of the invention is set forth in the claims appended hereto.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
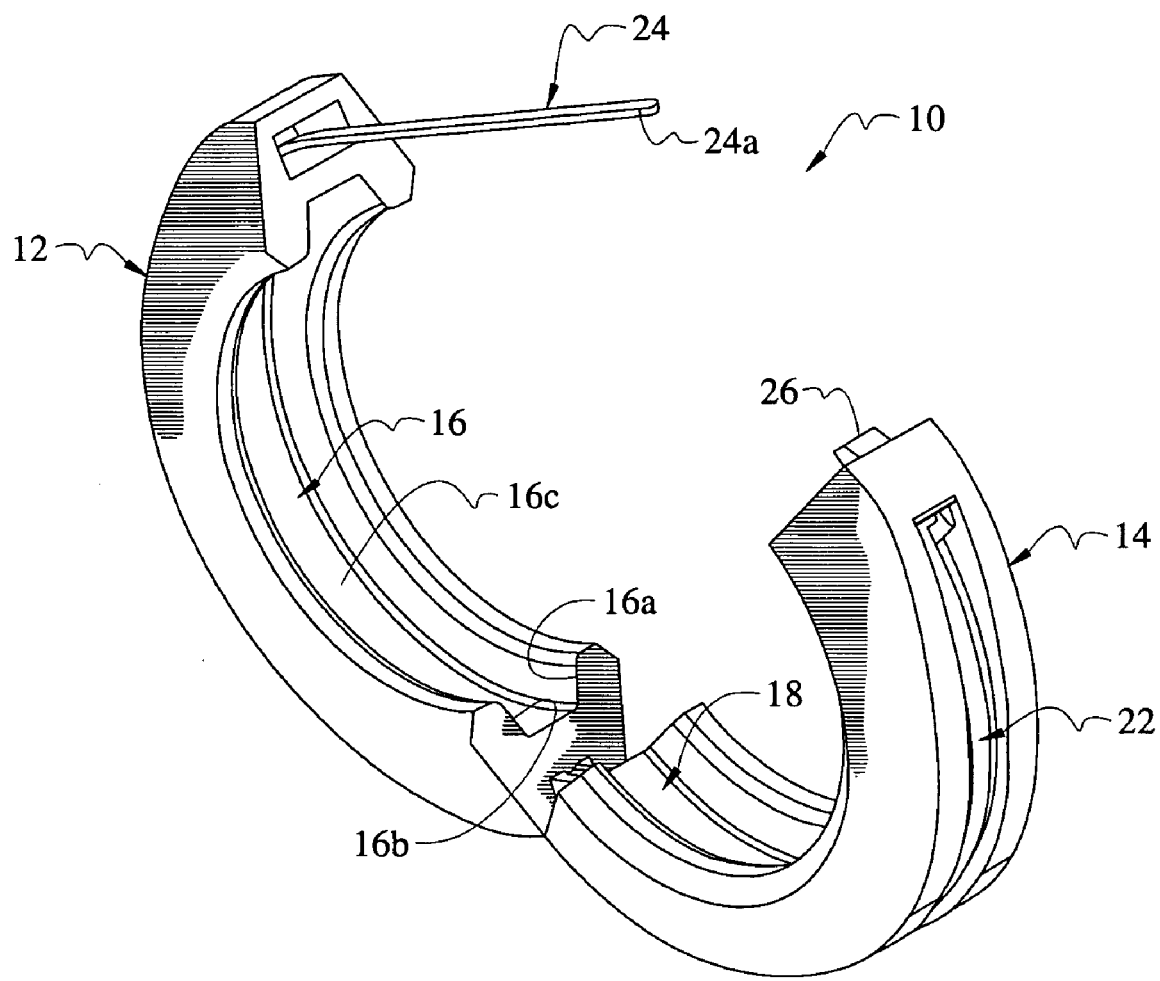
FIG. 1 is a perspective view of the novel clamp in an "open" configuration.

Referring now to FIG. 1, it will there be seen that an illustrative embodiment of the invention is denoted as a whole by the reference numeral 10.

Clamp 10 includes primary parts 12 and 14 of semicircular construction. Interior channel 16 is formed in the concave side of semicircular part 12 and includes tapered sidewalls 16a, 16b that converge toward one another, and flat bottom 16c. Interior channel 18 is formed in the concave side of semicircular part 14 and includes flat, tapered sidewalls 18a, 18b that converge toward one another, and flat bottom 18c. The sidewalls and flat bottom are not numbered in FIG. 1 to avoid cluttering the drawings; they may be seen in FIG. 7. Tapered walls 16a, 16b, 18a, 18b engage the longitudinally spaced apart flanges of a pair of abutting sanitary fittings, not depicted in FIG. 1, and drive said opposed flanges toward one another in an axial direction as the clamp is tightened.

Figure 2:
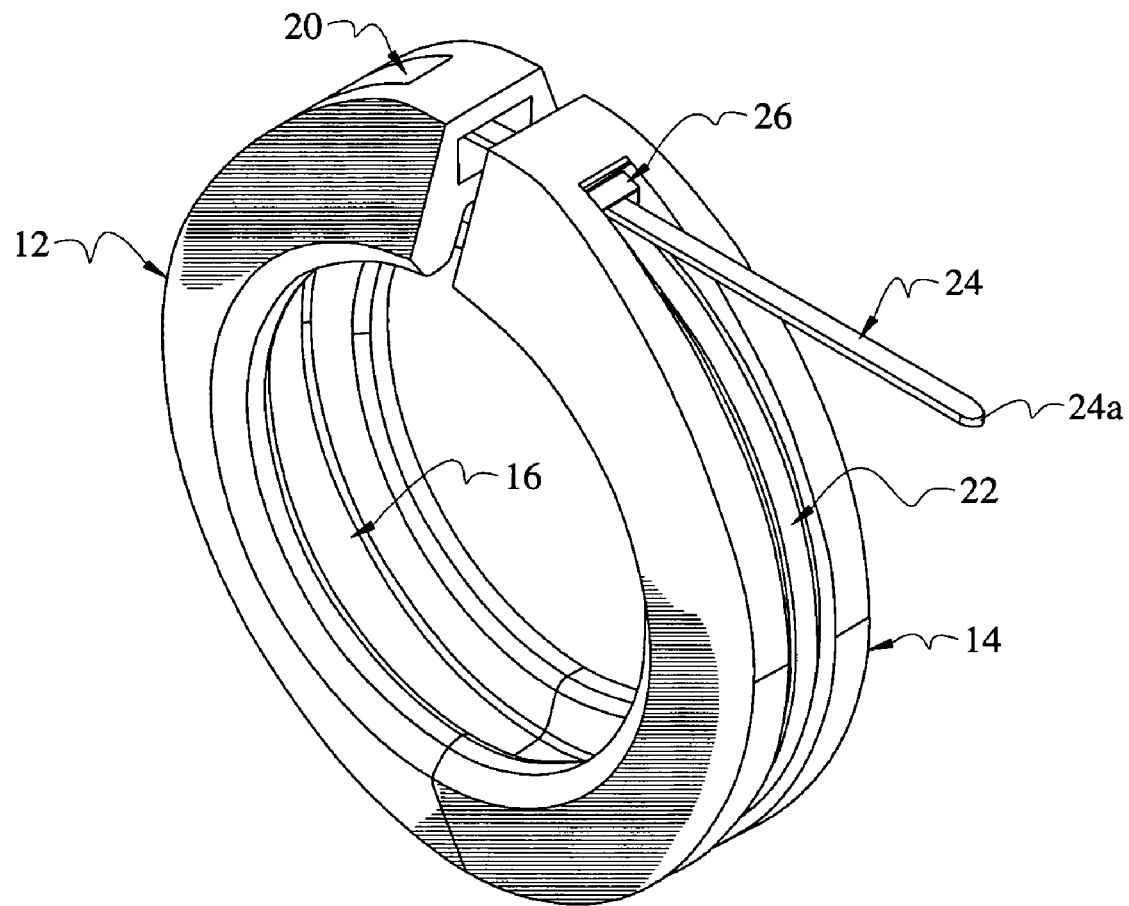
FIG. 2 is a perspective view of the novel clamp in a "closed" configuration.

FIG. 1 also depicts exterior channel 22 formed on the convex side of semicircular part 14. Exterior channel 22 has vertical sidewalls and a flat bottom wall but said parts are not numbered to avoid cluttering the drawings. Exterior channel 20 is not depicted in FIG. 1 but a short extent thereof is depicted in FIG. 2. Exterior channel 20 is formed on the convex side of semicircular part 12 and its construction is the same as that of exterior channel 22. In a preferred embodiment of the invention, a flexible band or cable tie 24 fits into exterior channels 20, 22 and circumscribes said semicircular parts 12, 14. However, the exterior channels are not required; the flexible cable tie works as long as it circumscribes the semicircular parts. The exterior channels prevent flexible cable tie 24 from sliding off clamp 10.

Figure 6:
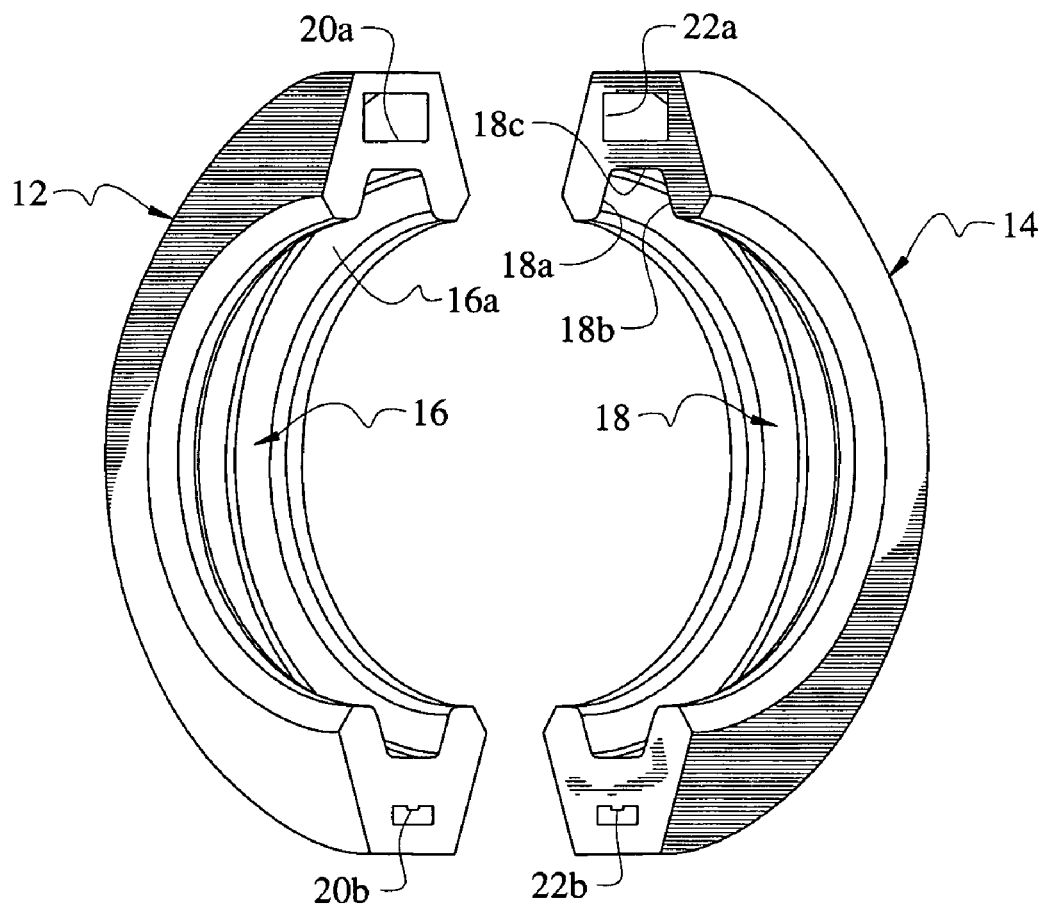
FIG. 6 is a perspective view depicting each of the two primary parts of the clamp disposed in a non-functional relationship to one another.

Unlike interior channels 16, 18, which extend the entire extent of the semicircular part within which they are formed, exterior channels 20, 22 extend almost the entire extent of their associated semicircular parts but stop short thereof at both ends. Accordingly, each channel 20, 22 forms a short tunnel, referred to hereinafter as a belt loop to better indicate its function, at its opposite ends as may be determined from FIGS. 1-4 but which is best depicted in FIG. 6. Note in FIG. 6 that belt loops 20a and 22a are larger than their counterparts 20b and 22b. This is because the smaller belt loops 20b, 22b are sized to slidingly receive the elongate medial part of flexible cable tie 24 and the larger belt loops 20a, 22a are sized to receive a cable tie head or catch member 26, at the proximal end of the cable tie, that engages free end 24a at the distal end of said flexible cable tie 24.

If catch 26 is of the non-releasable type, flexible cable tie 24 cannot be removed from circumscribing relation to clamp 10 unless said cable tie 24 is cut. A cut cable tie thus indicates tampering. If catch 26 is of the releasable type, then it could be tampered with. It follows that the non-releasable type of catch is preferred.

Belt loops 20a, 20b and 22a, 22b are not required to be formed at the opposite ends of their respective exterior channels 20, 22 as depicted. To function well, belt loops 20a, 20b merely need to be circumferentially spaced apart from one another and belt loops 22a, 22b need such spacing as well. Accordingly, said belt loops could be circumferentially spaced apart from one another and from the respective opposite ends of semicircular parts 12, 14. However, their function is more apparent to a user when they are positioned at the opposite ends of their respective exterior channels.

Figure 3:
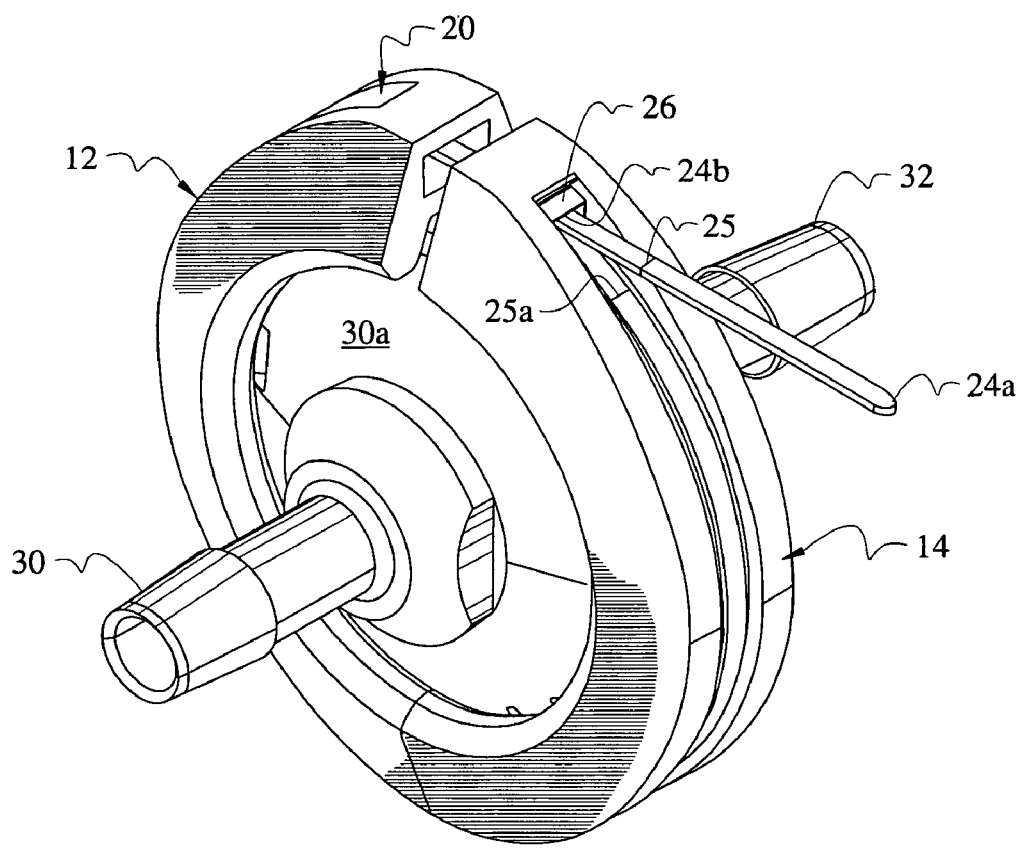
FIG. 3 is a perspective view of the novel clamp in a "closed" configuration relative to a sanitary fitting.

FIG. 3 depicts a first sanitary fitting 30 having flange 30a and a second sanitary fitting 32 having a similar flange, not depicted. Free end 24a of flexible cable tie 24 has been pulled through catch 26 to bring the first opposed ends of semicircular parts 12, 14 in close proximity to one another. As mentioned earlier, the tapered sidewalls of the interior channels drive the opposed flanges axially toward one another as desired as cable tie 24 is tightened. The amount of tightening required is predetermined and a first distance mark 25 is imprinted upon cable tie 24 near its distal free end 24a. In a first embodiment, a second distance mark 25a is imprinted on cable tie 24 at a predetermined location near its proximal end. A user pulls free end through catch 26 until first distance mark 25 is in registration with second distance mark 25a. The user stops pulling when said first and second distance marks are in alignment with one another so as not to over-tighten said flexible cable tie. This eliminates the need for a built-in torque nut or a torque wrench.

Placing the first distance mark on the cable tie in registration with the second distance mark on the cable tie to apply an optimal amount of tension to said cable tie, and hence the optimal amount of axially-directed closing force to the sanitary fitting, enables the user to perform the same operation repeatedly with other flexible cable ties on different sanitary fittings, with the amount of tension on the cable tie or converging axial force on the sanitary fittings always being substantially the same.

The use of the first and second distance marks in the manner just described is one of several ways to ensure a repeatable, optimal tightening of the cable tie. The second distance mark could be eliminated and a predetermined edge of catch 26 could represent the second distance mark. The position of the first distance mark would be predetermined so that the user would feed the distal end of the cable tie through catch 26 until the first distance mark near the distal end of said cable tie was in alignment with the predetermined edge of catch 26. This alignment of the first distance mark and said predetermined edge would produce the required tension in the cable tie and converging axial force in the sanitary fittings.

Sanitary fittings are mass-produced and the fittings of each class or type of sanitary fittings share the same structural characteristics as the other fittings of its type. Accordingly, the optimal force to tighten the fittings of each type is known. Thus, the flexible ties of each class or type of sanitary fitting are pre-marked, either with two distance marks that are to be brought into registration with one another, or with one distance mark that is brought into registration with a predetermined edge of catch 26.

Figure 4:
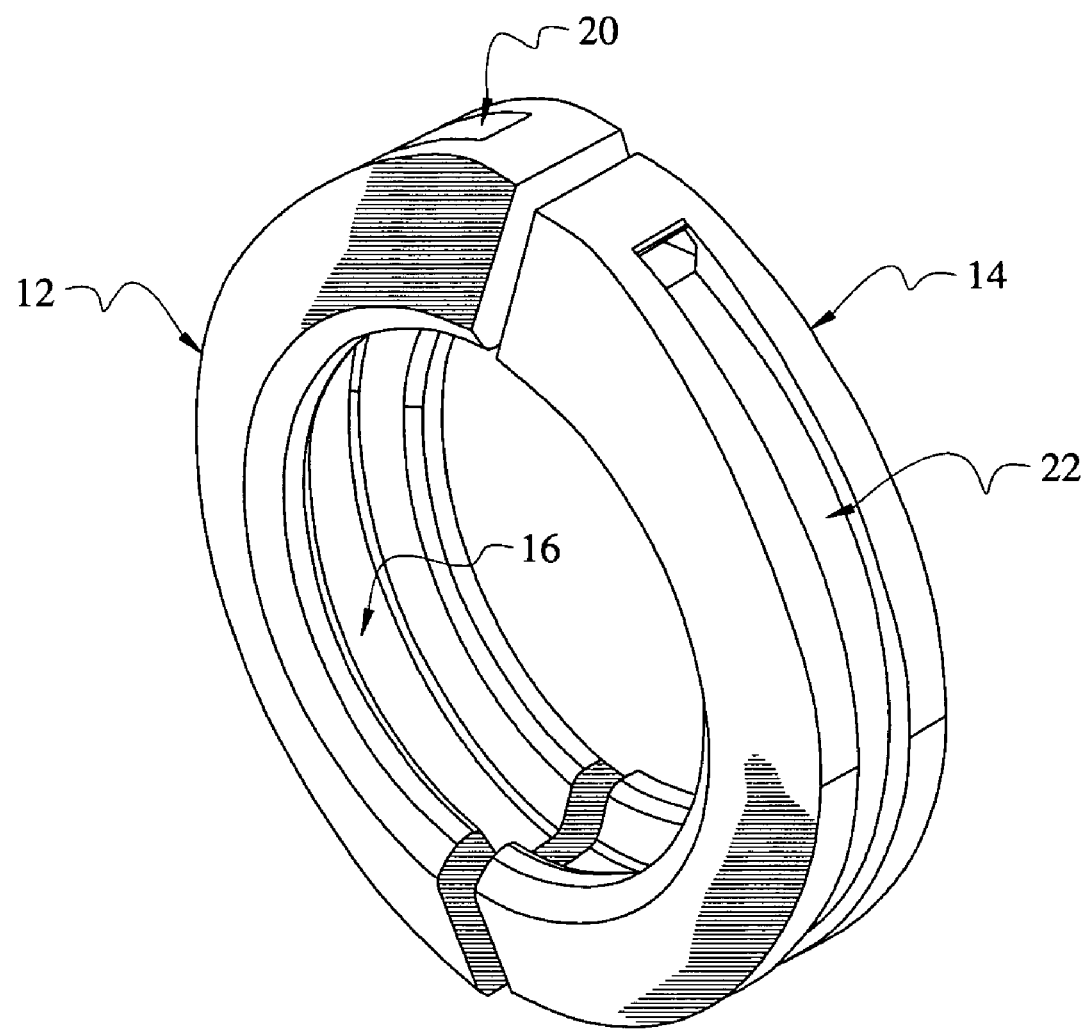
FIG. 4 is a perspective view of the novel clamp in a "closed" configuration and with the flexible band removed.

FIG. 4 depicts semicircular parts 12, 14 in spaced apart relation to one another with no flexible cable tie 24 in circumscribing relation thereto and with no sanitary fitting in circumscribed relation thereto. The purpose of FIG. 4 is to clarify the structure of said semicircular parts.

Figure 5:
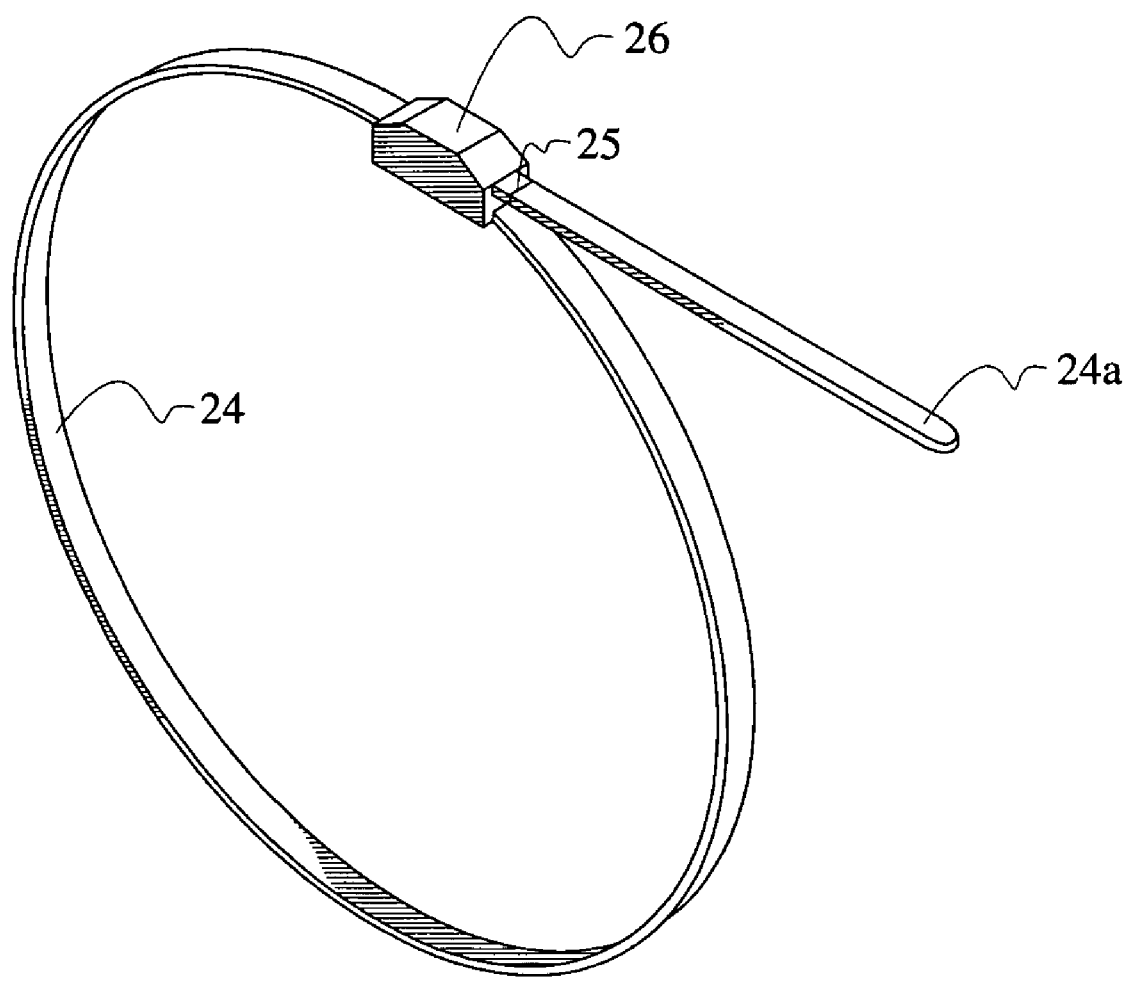
FIG. 5 is a perspective view of the flexible band in a locked configuration.

FIG. 5 depicts flexible cable tie 24 and catch 26 in isolation for the same purpose.

Figure 7:
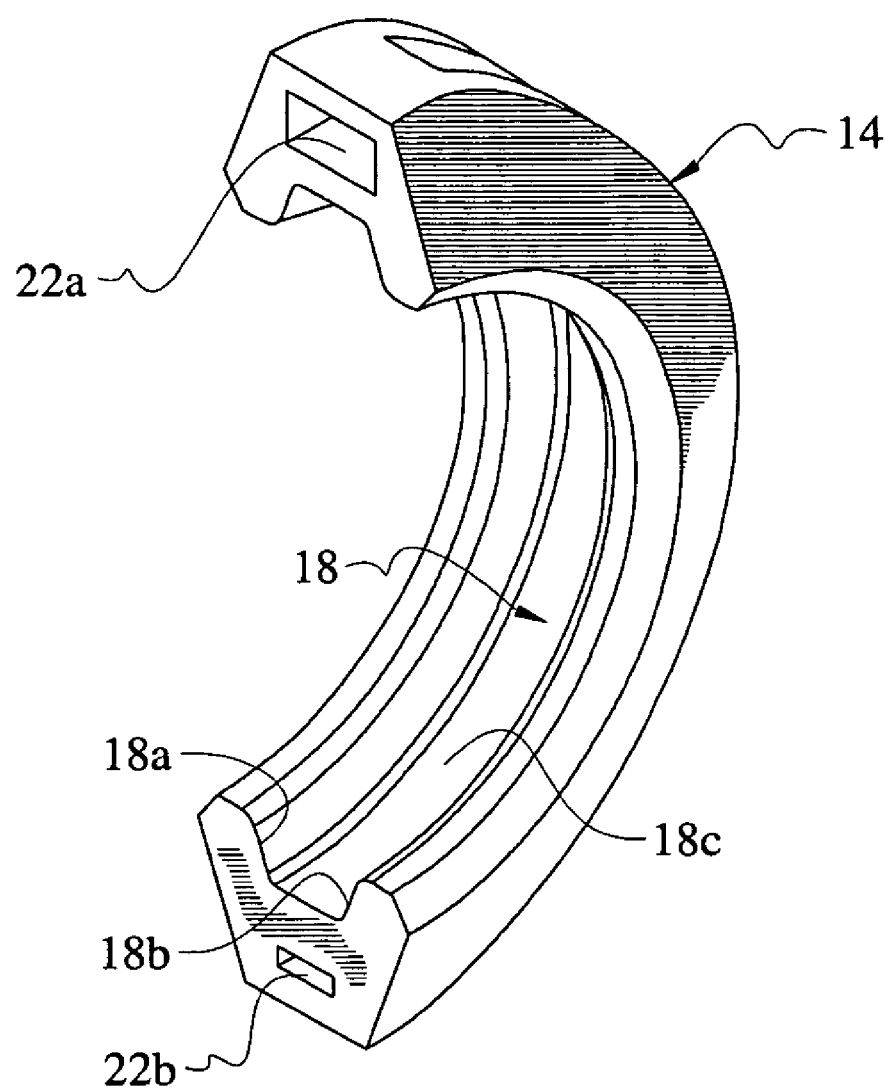
FIG. 7 is a perspective view of one of the primary parts that includes a view of part of the outer channel formed therein.

FIGS. 6 and 7 are also provided to clarify structure.

Figure 8:
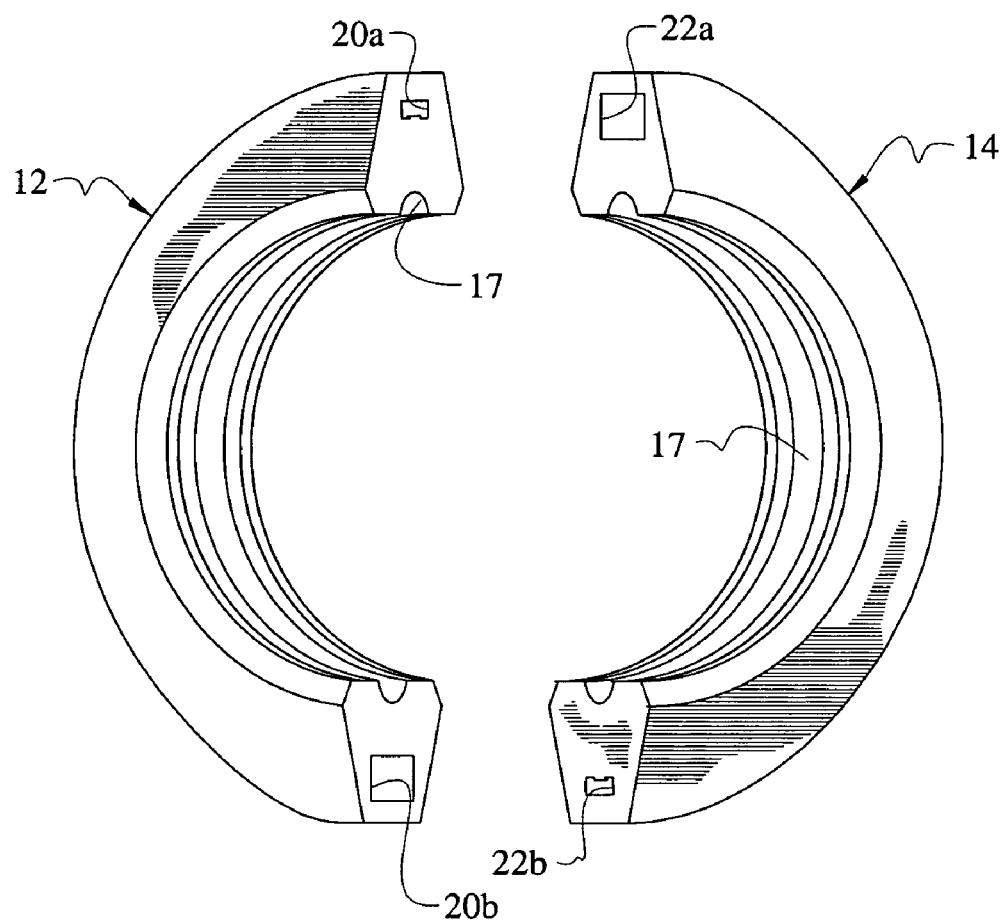
FIG. 8 is a perspective view like that of FIG. 6 but depicting a second embodiment of the invention.

FIG. 8 depicts an embodiment having a different structure. In this second embodiment, the shape of interior channel 16 of the earlier embodiments is changed from a taper to an arch or to a semicircle and said second embodiment of said interior channel is denoted 17. As used herein, the term "arch-shaped" includes various arch and semicircular shapes. This expands the utility of the novel device to enable it to be used as a tubing retention device for holding flexible tubing onto a hose barb. The hose barb may be of the type with or without a circumferential ridge that mates with the channel of the clamp. The cable tie is threaded through the channels formed in clamp parts 12, 14 at their respective opposite ends. A calibrated cable tie-tensioning gun brings the cable to a set point on the cable tie or to a preselected tension point on the gun. This causes the exertion of an optimal amount of pressure that is equally distributed around the circumference of the tubing and the hose barb assembly.

Cable ties may be of the parallel entry type (as depicted in the drawings) or the perpendicular entry type. They may be formed of plastic, metal, both plastic and metal, or other suitable materials.

Figure 9:
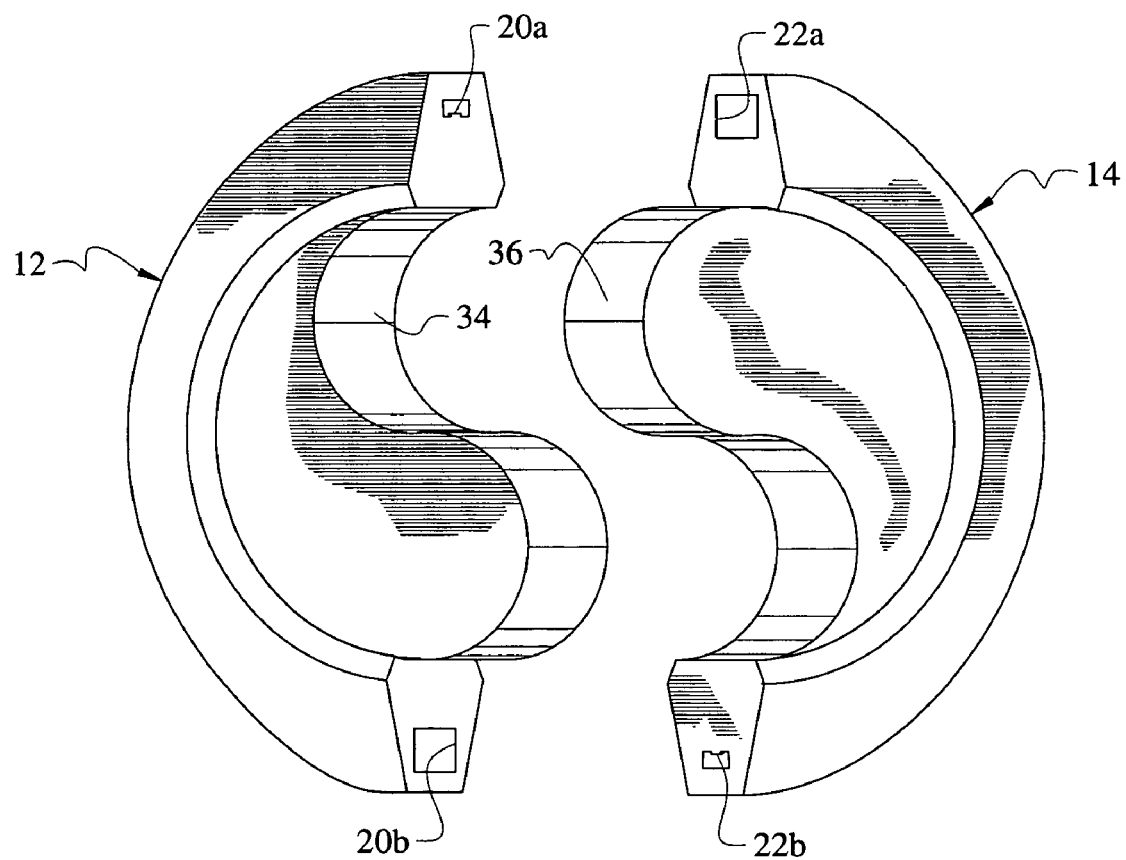
FIG. 9 is a perspective view like that of FIG. 8 but depicting a third embodiment of the invention.

Cable ties are typically sold in boxed quantities of twenty-five (25) and an economically-disposable, limited use, non-calibrated cable tie tensioning gun is usually included. Such an inexpensive tool, used in conjunction with the novel cable ties having distance markers, is just as effective as an expensive, commercially available, calibrated cable tie gun for bringing the tension in a cable tie to a set force as indicated on the gun. There are no cable tie guns or torque wrenches that are economically disposable. In a third embodiment, depicted in FIG. 9, a pair of "S"-shaped lobes 34, 36 are inverted with respect to one another so that they mate with one another when the clamp is closed. Lobes 34, 36 capture flexible tubing that is positioned between them in a pinching action. More specifically, each lobe engages the flexible tubing along a transverse line of contact when such tubing is disposed in sandwiched relation between said lobes. Cable tie 24 is tightened by a predetermined amount in the way described above (i.e., by using a calibrated tension gun or by aligning predetermined distance markers on the cable) to ensure that a known clamping force is exerted against the tubing to completely close it or to partially reduce its diameter to throttle the flow of fluid therethrough. This ensures against application of an excessive clamping force that could permanently close the tubing.

Lobes 34, 36 may be of a geometrical configuration other than the depicted "S"-shaped lobes. For example, the lobes could meet one another along a flat mating surface. Any other suitable mating surface is acceptable as long as the opposed lobes, when converged toward one another by tightening of the novel sanitary fitting, produce a complete or partial closure of the flexible tubing to thereby provide a repeatable and accurate pressure relief valve for flexible tubing.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:
1. A clamp assembly for a sanitary fitting, comprising:
an elongate, flexible cable tie;
a first semicircular clamp part;
said first semicircular clamp part having an interior, concave side and an exterior, convex side;
a first exterior channel formed in said exterior, convex side of said first semicircular clamp part;
a first inner channel formed in said interior, concave side of said first semicircular clamp part;
said first inner channel extending from a first end of said first semicircular clamp part to a second end of said first semicircular clamp part;
a second semicircular clamp part;
said second semicircular clamp part having an interior, concave side and an exterior, convex side;
a second exterior channel formed in said exterior, convex side of said second semicircular clamp part;
a second inner channel formed in said interior, concave side of said second semicircular clamp part;

said second inner channel extending from a first end of said second semicircular clamp part to a second end of said second semicircular clamp part;

said first and second inner channels adapted to accommodate a flange of a sanitary fitting when said first and second semicircular parts are disposed in confronting relation to one another;

said elongate, flexible cable tie having a length sufficient to circumscribe said first and second semicircular parts when said first and second semicircular parts are disposed in confronting relation to one another;

said elongate, flexible cable tie having a cable tie catch at a proximal end thereof and a free end at a distal end thereof;

said cable tie catch adapted to slidingly receive said free end when said elongate, flexible cable tie is disposed in circumscribing relation to said confronting first and second semicircular parts;

a first distance mark formed on said flexible cable tie at a predetermined location thereon near said distal free end;

a second distance mark formed on said clamp assembly at a predetermined location;

said first distance mark being in a predetermined registration with said second distance mark when said elongate, flexible cable tie is under a predetermined amount of tension;

said elongate, flexible cable tie received within said first and second exterior channels when said flexible cable tie is disposed in said circumscribing relation to said first and second semicircular parts;

a first belt loon formed in said first exterior channel; and a first belt loop formed in said second exterior channel;

whereby the same amount of tension is consistently applied to said elongate, flexible cable tie by tightening said cable tie until said first and second distance marks are in said registration with one another.

2. The clamp assembly of claim 1, further comprising:
said second distance mark being on said flexible cable tie near said proximal end thereof.

3. The clamp assembly of claim 1, further comprising:
said second distance mark being a predetermined edge of said catch so that said clamp is optimally tightened when said first mark is in alignment with said predetermined edge of said catch.

4. The clamp assembly of claim 1, further comprising:
a second belt loop formed in said first exterior channel in circumferentially spaced apart relation to said first belt loop formed in said first exterior channel;

a second belt loop formed in said second exterior channel in circumferentially spaced apart relation to said first belt loop formed in said second exterior channel.

5. The clamp assembly of claim 4, further comprising:
said first belt loop formed in said first exterior channel adapted to receive said catch;

said second belt loop formed in said first exterior channel adapted to receive said elongate, flexible cable tie.

6. The clamp assembly of claim 4, further comprising:
said first belt loop formed in said second exterior channel adapted to receive said catch;

said second belt loop formed in said second exterior channel adapted to receive said elongate, flexible cable tie.

7. The clamp assembly of claim 1, further comprising:
said first and second inner channels each having a flat bottom and opposed sidewalls that taper toward one another from top to bottom;

whereby a pair of axially aligned sanitary fittings are pushed in converging relation toward one another by said opposed sidewalls of said first and second inner channels when said confronting semicircular parts are pushed toward one another as said flexible cable tie is tightened.

8. The clamp assembly of claim 1, further comprising:
said first and second inner channels each having an arch-shape;

whereby a pair of axially aligned sanitary fittings are pushed in converging relation toward one another by said arch-shape of said first and second inner channels when said confronting semicircular parts are pushed toward one another as said flexible cable tie is tightened.

* * * * *